United States Patent
Ioi

(10) Patent No.: US 6,936,938 B2
(45) Date of Patent: Aug. 30, 2005

(54) ELECTRIC MOTOR FOR SEALED COMPRESSORS

(75) Inventor: Nobuyasu Ioi, Gifu-pref. (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/401,679

(22) Filed: Mar. 31, 2003

(65) Prior Publication Data

US 2003/0184167 A1 Oct. 2, 2003

(30) Foreign Application Priority Data

Apr. 2, 2002 (JP) ...................................... 2002-100357

(51) Int. Cl.⁷ ............................................... H02K 9/00
(52) U.S. Cl. ............................. 310/52; 310/68; 310/89
(58) Field of Search .............................. 310/52, 68, 89

(56) References Cited

U.S. PATENT DOCUMENTS

| | | | | |
|---|---|---|---|---|
| 4,791,329 A | * | 12/1988 | Ubukata | 310/68 |
| 4,877,985 A | * | 10/1989 | Byrd | 310/86 |
| 5,579,653 A | * | 12/1996 | Sugiyama | 62/508 |
| 5,952,748 A | * | 9/1999 | Boldlehner | 310/54 |
| 5,998,903 A | | 12/1999 | Umeda et al. | |
| 6,191,508 B1 | | 2/2001 | Aoki et al. | |
| 6,462,453 B1 | * | 10/2002 | Asao | 310/179 |
| 6,657,331 B2 | * | 12/2003 | Asao | 310/179 |

FOREIGN PATENT DOCUMENTS

| | | |
|---|---|---|
| JP | A-5-236693 | 9/1993 |
| JP | B2-2927288 | 5/1999 |
| JP | B2-3112011 | 9/2000 |

OTHER PUBLICATIONS

Safty (MSDS) data for 1,1,1,2–tetrafuororoethane.*

* cited by examiner

Primary Examiner—Darren Schuberg
Assistant Examiner—Iraj A. Mohandesi
(74) Attorney, Agent, or Firm—Posz Law Group, PLC

(57) ABSTRACT

An electric motor for wholly sealed compressors using, as a coolant, HFC-134a and using, as a refrigerator oil, a polyalkylene glycol oil, a polyol ester oil or a polyvinyl ether oil, and having a structure in which the free conductors are firmly secured and insulated with an insulating material which is chemically stable and has excellent insulating property. A plurality of free conductors are insulted from and secured to each other with an epoxy resin and, preferably, with a powdery epoxy resin. The powdery epoxy resin is particularly effective in insulating the coil ends of the electric motor for sealed compressors provided with a stator in which a coil wound on the stator core is constituted by a plurality of conductor segments, and the ends (coil ends) of the conductor segments protruding beyond the core are joined to each other to form the coil.

9 Claims, 4 Drawing Sheets

ELECTRIC MOTOR FOR SEALED COMPRESSORS

BACKGROUND OF THE INVENTION

1. Field of the Invention

The present invention relates to an electric motor for sealed compressors. More specifically, the invention relates to technology for maintaining insulation of conductor ends of a stator coil and other free conductors in an electric motor for sealed compressors that use a fluorine-contained coolant and further use, as a refrigerator oil, a polyalkylene glycol oil, a polyol ester oil or a polyvinyl ether oil.

2. Description of the Related Art

The present applicant has previously developed an alternator featuring a compact size, a high output and low noise, and disclosed it as Japanese Patent No. 2927288. This alternator is equipped with a stator of a constitution in which a coil wound on the stator core is constituted by a plurality of conductor segments, and the ends (coil ends) of the conductor segments protruding beyond the core are joined to each other to form a coil. This alternator is the one used for the vehicles, assures a high output required for the alternators for vehicles by providing the structure of a rotor and a stator winding capable of producing the output from a low-speed region and, by providing a novel constitution for cooling the coil ends of the stator winding, suppressing a reduction in the efficiency and output caused by the generation of heat. The alternator for vehicles further features improved space factor in the slots of the stator winding while increasing the cooling ability and reducing noise on the outside of the slots as a result of cooperation with the rotor. The alternator for vehicles further suppresses a local temperature rise in the stator winding and suppresses the occurrence of magnetic noise.

The present invention is concerned with solving problems that arouse when the above alternator of the novel structure is applied and, particularly, when the structure of the stator is applied to an electric motor for wholly sealed compressors.

That is, the present applicant has developed an electric motor for wholly sealed compressors, featuring a compact size, a high output and low noise by applying the structure of the stator of the above alternator to the electric motor for wholly sealed compressors that use, as a coolant, a fluorinated hydrocarbon (HFC) such as 1,1,1,2-tetrafluoroethane.

However, it has been known that the insulating material tends to be easily deteriorated as the wholly sealed compressor uses a fluorinated hydrocarbon (HFC) such as 1,1,1,2-tetrafluoroethane as a coolant and further uses a polyalkylene glycol oil or a polyol ester oil as a refrigerator oil. To solve this problem, Japanese Unexamined Patent Publication (Kokai) No. 5-236693 discloses the use of 1,1,1,2-tetrafluoroethane as a coolant, polyalkylene glycol oil or polyol ester oil as a refrigerator oil, polyethylene terephthalate as an insulating film and polyester varnish as a conductor insulating layer. According to the above publication, it is possible to maintain the life longer than that of the electric motor for wholly sealed compressors that have heretofore been stably used by employing the above constitution even when the fluorinated hydrocarbon (HFC) such as 1,1,1,2-tetrafluoroethane is used as a coolant, and the polyalkylene glycol oil or the polyol ester oil is used as the refrigerator oil.

The inventors, however, have encountered the following problems when they have attempted to fabricate an electric motor for wholly sealed compressors of the invention according to the disclosure of Japanese Unexamined Patent Publication (Kokai) No. 5-236693.

In the electric motor for wholly sealed compressors, a stator core has a laminated core forming a plurality of slots extending through a laminated plate, a multi-phase stator winding has a plurality of conductor segments which are held in the slots being insulated from each other and are arranged extending toward the end surface side of the stator core outside the slots, coil ends are formed by connection patterns that connect in series different layers in the slots spaced apart to meet a pitch of magnetic poles of the rotor thereby to form a group of coil ends repeating chiefly the connection pattern on the end surface side of the stator core, the coil ends being spaced apart from each other. In the electric motor for wholly sealed compressors, the stator coil ends are spaced apart from each other and are insulated. Therefore, no insulating layer is necessarily required. However, a polyester varnish is applied as an insulating layer to the conductors in general of the motor for wholly sealed compressors inclusive of the coil ends.

However, the polyester varnish chiefly comprises liquid components and has no force for firmly holding the positions of the conductors. Prior to being mounted in the compressor after the varnish has been applied to the stator, therefore, the free conductor portions are subject to be deformed being caused by violent handling by the worker or due to shocks during the transit. As a result, the conductors often come into frictional contact giving rise to the occurrence of defective insulation. In the electric motor for wholly sealed compressors, in particular, the coil ends of the stator are freely protruding and are subject to be deformed to cause defective insulation. Shocks similar to those of during the transit may occur even after the products have been completed.

SUMMARY OF THE INVENTION

In view of the above-mentioned problems, it is an object of the present invention to provide an electric motor for wholly sealed compressors using, as a coolant, a 1,1,1,2-tetrafluoroethane and using, as a refrigerator oil, a polyalkylene glycol oil, a polyol ester oil or a polyvinyl ether oil, and having a structure in which the free conductors are firmly secured and insulated with an insulating material which is chemically stable and has excellent insulating property.

Namely, the invention is concerned with an electric motor for sealed compressors as described below.

(1) An electric motor for sealed compressors using a fluorinated hydrocarbon as a coolant, wherein a plurality of free conductors are insulated and secured relative to each other with an epoxy resin.

(2) An electric motor for sealed compressors according to (1) above, wherein said epoxy resin is the one obtained by curing a powdery epoxy resin.

(3) An electric motor for sealed compressors according to (1) or (2) above, wherein a 1,1,1,2-tetrafluoroethane is used as the coolant.

(4) An electric motor for sealed compressors according to (1) to (3) above, wherein the electric motor for sealed compressors uses, as a refrigerator oil, a polyalkylene glycol oil, a polyol ester oil or a polyvinyl ether oil.

(5) An electric motor for sealed compressors according to (1) to (4) above, wherein said electric motor for sealed compressors is provided with a stator of a structure in which a coil wound on the stator core is constituted by a plurality of conductor segments, and the ends (coil ends) of the conductor segments protruding beyond the core are joined to each other to form the coil, and said plurality of coil ends are insulated and secured to each other.

(6) An electric motor for sealed compressors, having a rotor core of a laminated electromagnetic steel plate having field magnets in the outer periphery thereof to form NS magnetic poles, wherein a stator core has a laminated core forming a plurality of slots extending through a laminated plate, a multi-phase stator winding has a plurality of conductor segments which are held in the slots being insulated from each other and are arranged extending toward the end surface side of the stator core outside the slots, coil ends are formed by connection patterns that connect in series different layers in the slots spaced apart to meet a pitch of magnetic poles (north and south) of the rotor thereby to form a group of coil ends repeating chiefly the connection pattern on the end surface side of the stator core, the coil ends being spaced apart from each other and being insulated and secured to each other with a powdery epoxy resin.

DESCRIPTION OF THE PREFERRED EMBODIMENTS

Figure 1:
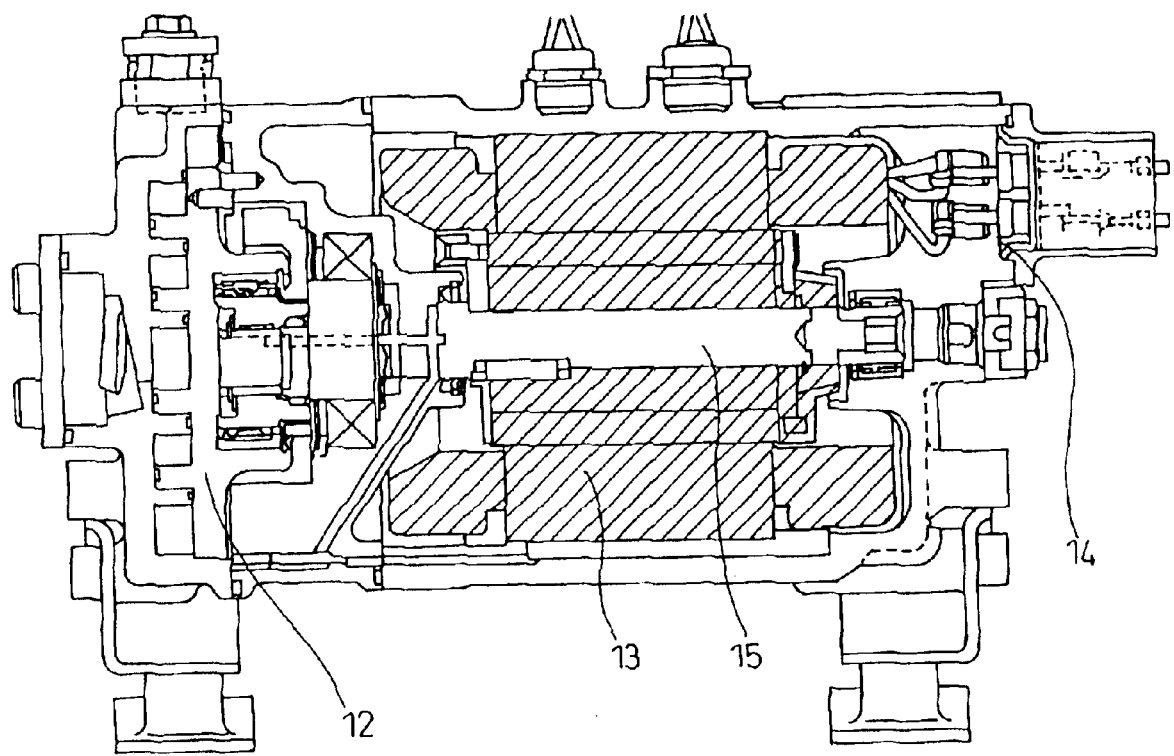
FIG. 1 is a vertical sectional view of an electric motor for sealed compressors according to an embodiment.

The present invention is concerned with an electric motor for sealed compressors in which a plurality of free conductors of the electric motor for sealed compressors using a fluorinated hydrocarbon as a coolant, are insulated and secured to each other with an epoxy resin.

A typical example of the fluorinated hydrocarbon used as the coolant may be a 1,1,1,2-tetrafluoroethane (HFC134a). Not being limited thereto only, however, the present invention effectively works even when R410a, R407C, R32 or R125 is used.

In the present invention, the refrigerator oil is preferably a polyalkylene glycol oil, a polyol ester oil or a polyvinyl ether oil. This is because the fluorinated hydrocarbon used as the coolant easily dissolves the refrigerator oils.

When the fluorinated hydrocarbon such as 1,1,1,2-tetrafluoroethane (HFC134a) is used as the coolant particularly in combination with the polyalkylene glycol oil, polyol ester oil or polyvinyl ether oil as the refrigerator oil, however, there arises a problem in that the conductor-insulating material is deteriorated to a conspicuous degree. So far, therefore, it has been proposed to use a polyester varnish as the conductor-insulating material. As described in the section of the description of the related art, however, when the polyester varnish is used as the conductor-insulating material, and the electric motor for sealed compressors is assembled, poor handling properties derived from the polyester varnish may bring about a problem in that the insulation becomes defective among the conductors due to deformation of the free conductors. The present inventors have discovered the fact that an epoxy resin can be used even in the above-mentioned environment as a conductor material for the electric motor for sealed compressors, the epoxy resin remaining chemically stable, exhibiting excellent insulating property, and firmly securing and insulating the free conductors.

The insulating material used in the present invention is an epoxy resin. The present inventors have discovered the fact that the epoxy resin is chemically stable and can be used in an environment of the above fluorine-contained coolant and still exhibit an excellent insulating property. The inventors have further discovered that the epoxy resin is curable and is capable of firmly securing a plurality of conductors. So far, there has been known only a liquid polyester varnish. The present invention, however, provides an insulating material of the solid (curing) type which is chemically stable and can be used in an environment of the flourine-contained coolant while exhibiting an excellent insulating property. The inventors have also studied phenol resins, styrene resins and acrylic resins as the insulating materials of the solid (curing) type to find that they were unstable and could not be used under the above-mentioned environment of fluorine-contained coolant. In the case of the refrigerator compressor, the components decomposed and extracted from the insulating material may clog capillary tubes in the refrigerator cycle.

There is no particular limitation on the kind of the epoxy resin or the method of application to the free conductors. Desirably, however, the epoxy resin that is used is a so-called powdery epoxy resin. The powdery epoxy resin is also called powdery epoxy coating material which can be thickly applied onto the surfaces that are to be coated and undergoes a small fluidization and deformation at the time when it is cured by heating. For example, the epoxy resin of the bisphenol type is blended with a solid filler such as fused silica and with any acid anhydride. The epoxy resin, therefore, is best suited for securing and insulating the free conductors. There have heretofore been known powdery epoxy resins, such as "EPIFORM" F-6975 (trade mark) of Somar Corporation.

The free conductors can be easily coated with the powdery epoxy resin by impregnating the free conductors with the powdery epoxy resin so as to be secured.

In the present invention, what are secured and insulated with the epoxy resin are conductors in general in the electric motor for sealed compressors using the fluorinated hydrocarbon as a coolant. In the present invention, in particular, the effect is exhibited when the epoxy resin is applied to the free conductors to secure and insulate them.

In particular, the present invention exhibits a distinguished effect when the epoxy resin is used for insulating and securing the free conductors of the electric motor for sealed compressors having a stator of basically the same structure as that of the alternator disclosed in the above-mentioned Japanese Patent No. 2927288 and, particularly, for insulating and securing the coil ends of the stator having a particular structure. Concretely speaking, in an electric motor for sealed compressors having a rotor core of a laminated electromagnetic steel plate having field magnets in the outer periphery thereof to form magnetic poles, a stator core has a laminated core forming a plurality of slots extending through a laminated plate, a multi-phase stator winding has a plurality of conductor segments which are held in the slots being insulated from each other and are arranged extending toward the end surface side of the stator core outside the slots, and coil ends are formed by connection patterns that connect in series different layers in the slots spaced apart to meet the pitch of magnetic poles of the rotor thereby to form a group of coil ends repeating chiefly the connection pattern on the end surface side of the stator core, the coil ends being spaced apart from each other and being insulated and secured to each other with an epoxy resin and, particularly, with a powdery epoxy resin.

The electric motor for sealed compressors of this structure employs a connection pattern for connecting in series the two conductor segments that are arranged as different layers in different slots being spaced apart to meet the pitch of magnetic poles of the rotor, whereby the conductor segment forming a predetermined layer in one slot is connected in series with the conductor segment forming a layer different from the above predetermined layer in the other slot. This suppresses the interference of the coil ends of the phases and, hence, makes it possible to increase the space factor of the stator winding accompanied by an increase in the output. The lengths of the conductors of the stator winding of each of the phases depending upon the positions of conductor segments in the slots and the leakage inductances, are uniformalized. Accordingly, the currents flowing into the stator winding is uniformalized, and heat is generated in an equal amount by the phases. This, therefore, prevents local heating of the stator winding and prevents an unbalance in the magnetomotive force, making it possible to lower the temperature and to decrease noise.

There can be further employed a constitution in which the coil end is formed by joining an end of a first electric conductor extending from the first slot to an end of a second electric conductor extending from the second slot, the first electric conductor and the second electric conductor being formed by separate electrically conducting segments, and the end of the one electric conductor having an angle and a length enough to move a distance of at least one-half of the pitch of the magnetic poles.

Thus, a coil end is formed by arranging a segment so as to extend beyond a slot and joining it to another segment. Employment of the constitution based on the above junction makes it possible to use the segments. The junction stands for an electric connection accomplished by ultrasonic welding, arc welding or brazing.

The segment is a U-shaped one formed by continuously connecting the two electric conductors through a turning portion at one end of the stator core. It is desired to employ a constitution in which the coil end is formed, as a connection pattern, by joining an end of a first U-shaped segment which is an end of the first electric conductor to an end of the second U-shaped segment which is an end of the second electric conductor. This constitution makes it possible to halve the number of parts and the number of junction portions and, hence, to facilitate the steps of production. Further, the junction portions are arranged on one side of the stator in the axial direction to facilitate the steps of production.

There may be further employed a constitution in which a segment has two ends protruding from two sides of the slot, a coil end is formed as a connection pattern by joining one end of the first segment which is an end of the first electric conductor to one end of the second segment which is an end of the second electric conductor at one end of the stator core, and another coil end is formed as a connection pattern by joining the other end of the first segment which is an end of the first electric conductor to the other end of a third segment which is another end of the second electric conductor at the other end of the stator core. Then, the conductor segment is formed in a simple shape extending in one direction facilitating the steps of producing the electrically conducting segments. Besides, as the electrically conducting segment that has been formed in advance can be pushed into the slot from the inner peripheral side in the radial direction, the coil end portion requires no working as compared to when the conductor segment is inserted from the axial direction, facilitating the steps of production and increasing the space factor.

In the electric motor for sealed compressors equipped with the stator of the constitution in which the coil wound on the stator core is formed by a plurality of conductor segments, and the ends (coil ends) of the conductor segments protruding beyond the core are joined together to form the coil, as described above, a problem arises in that the free coil ends are easily deformed due to a careless assembling operation of the stator or due to shock during the transit giving rise to the occurrence of defective insulation among the coil ends when the free coil ends of the stator are insulated by being coated with the polyol ester-type liquid varnish which is a known insulating material for HFC134a. The shock during the transit occurs not only during the step of producing the electric motor but also even after the electric motor has been completed. The present invention was developed in order to solve the above problem and best exhibits its effect in the electric motor for sealed compressors having a coil structure of the stator as described above. When the fluorinated hydrocarbon such as 1,1,1,2-tetrafluoroethane (HFC134a) is used as the coolant and polyalkylene glycol oil, polyol ester oil or polyvinyl ether oil is, further, used as the refrigerator oil, the conductor-insulating material remains chemically stable and, besides, the insulating material is of the cured (solid) type. In the electric motor for sealed compressors which uses the fluorinated hydrocarbon such as 1,1,1,2-tetrafluoroethane (HFC134a) as the coolant and, further, uses the polyalkylene glycol oil, polyol ester oil or polyvinyl ether oil as the refrigerator oil, therefore, the insulating material exhibits the effect that could not be obtained thus far when it is used for insulating the conductors in general. In the electric motor for sealed compressors which uses the fluorinated hydrocarbon such as 1,1,1,2-tetrafluoroethane (HFC134a) as the coolant and, further, uses polyalkylene glycol oil, polyol ester oil or polyvinyl ether oil as the refrigerator oil, there has heretofore been known the polyol ester-type liquid varnish only. Therefore the present invention significantly provides an insulating material of the curing (solid) type for the similar applications.

The coil ends of the stator are usually exposed to an atmosphere where a solvent flows.

The structure of the motor for sealed compressors of the present invention will now be described with reference to the drawings.

Figure 2:
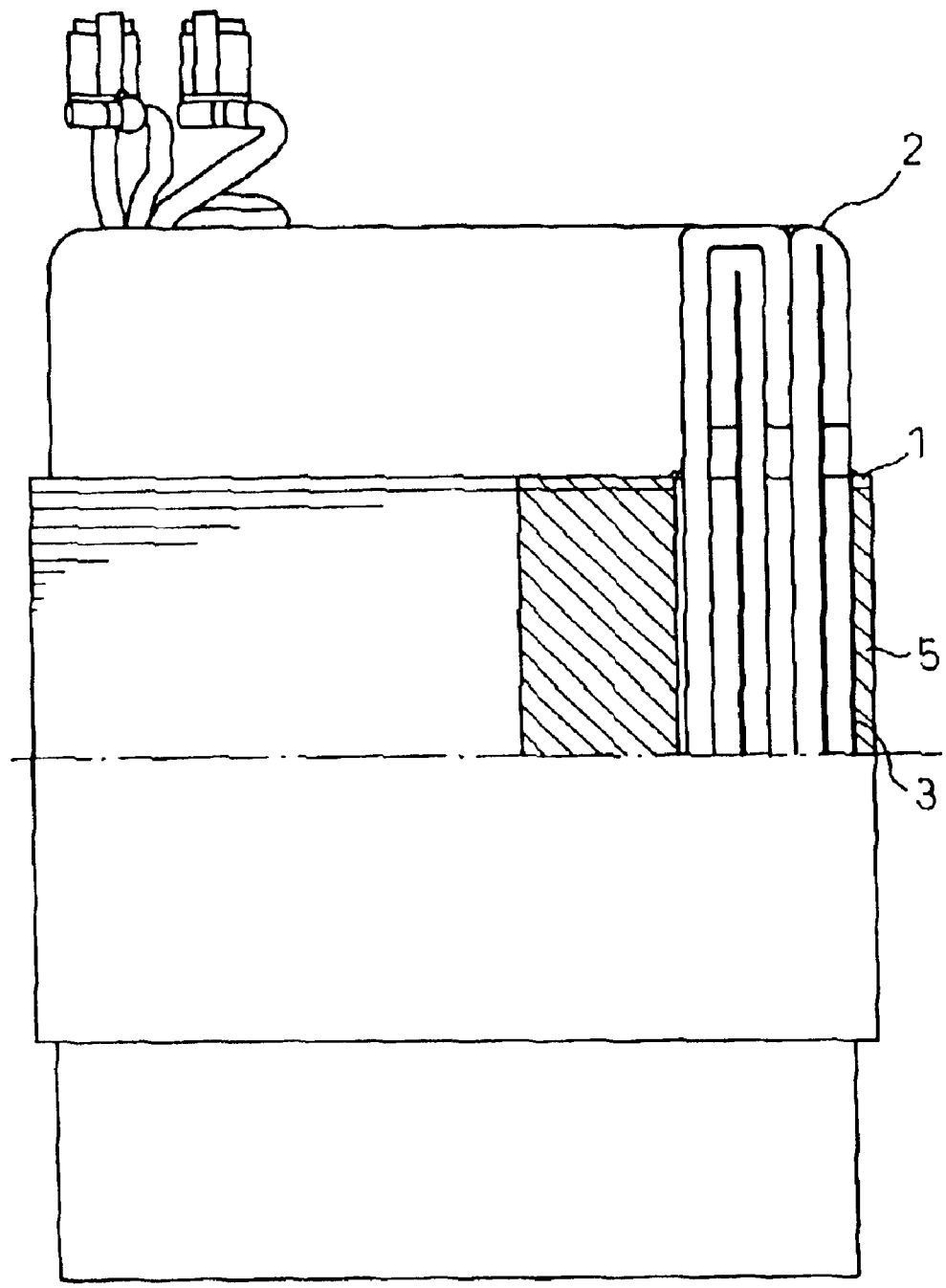
FIG. 2 is a view illustrating a portion of a stator of the electric motor for sealed compressors of FIG. 1.

FIG. 1 is a vertical sectional view of the motor for sealed compressors according to an embodiment of the present invention. In FIG. 1, reference numeral 12 denotes a compression unit, 13 denotes an electric motor unit, 14 denotes a hermetic terminal, and 15 denotes a shaft. FIG. 2 shows a portion of a stator of the electric motor. In FIG. 2, reference numeral 21 denotes a stator terminal plate, 22 denotes a flat square copper wire, 23 denotes an insulating paper and 25 denotes a laminated sheet of the stator.

Figure 3:
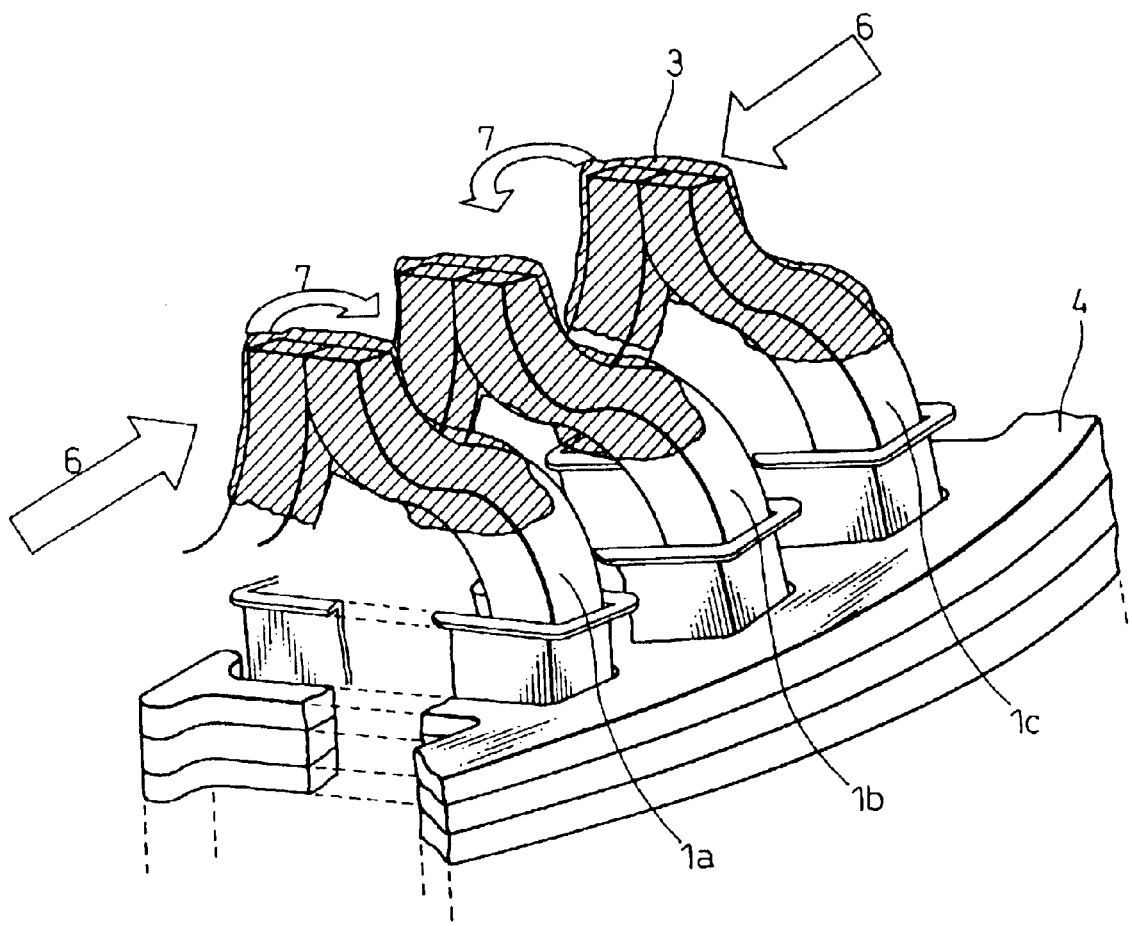
FIG. 3 is a view illustrating coil end portions of the stator, wherein a coil end-insulating material is a liquid varnish.

FIG. 3 shows coil end portions of the stator of FIG. 2. A stator core 4 comprises a laminated plate and in which a plurality of slots are formed extending therethrough. A plurality of conductor segments 1a, 1b, 1c of flat square copper wires are inserted in the slots, and the ends of the conductor segments are joined together by welding to form a stator coil.

FIG. 3 illustrates a state where a liquid polyester-type varnish 3 is applied to the coil end portions of the stator. In mounting the above stator in the electric motor, the coil ends may undergo deformation and come in contact with each other as designated at 7 due to shock imparted thereto as indicated by an arrow 6. Then, the varnish which is in a liquid state is not capable of preventing the conductors at the coil ends from coming in contact with each other, and defective insulation often occurs.

In an attempt to secure and insulate the coil ends so that the conductors of the coil ends will not come in contact with each other even when a shock is received and that the defective insulation can be prevented, therefore, the inventors have tried to obtain insulation by using a phenol resin. The insulating material, however, deteriorated to a striking degree and was not useful when there were used, as a coolant, the fluorinated hydrocarbon such as 1,1,1,2-tetrafuoroethane (HFC134a) and, as a refrigerator oil, polyalkylene glycol oil, polyol ester oil or polyvinyl ether oil. In particular, the oligomer was extracted from the insulating material and could clog capillary tubes in the refrigerator cycle. It was further attempted to obtain insulation by using several kinds of curable resins which, however, proved inferior in chemical stability.

Figure 4:
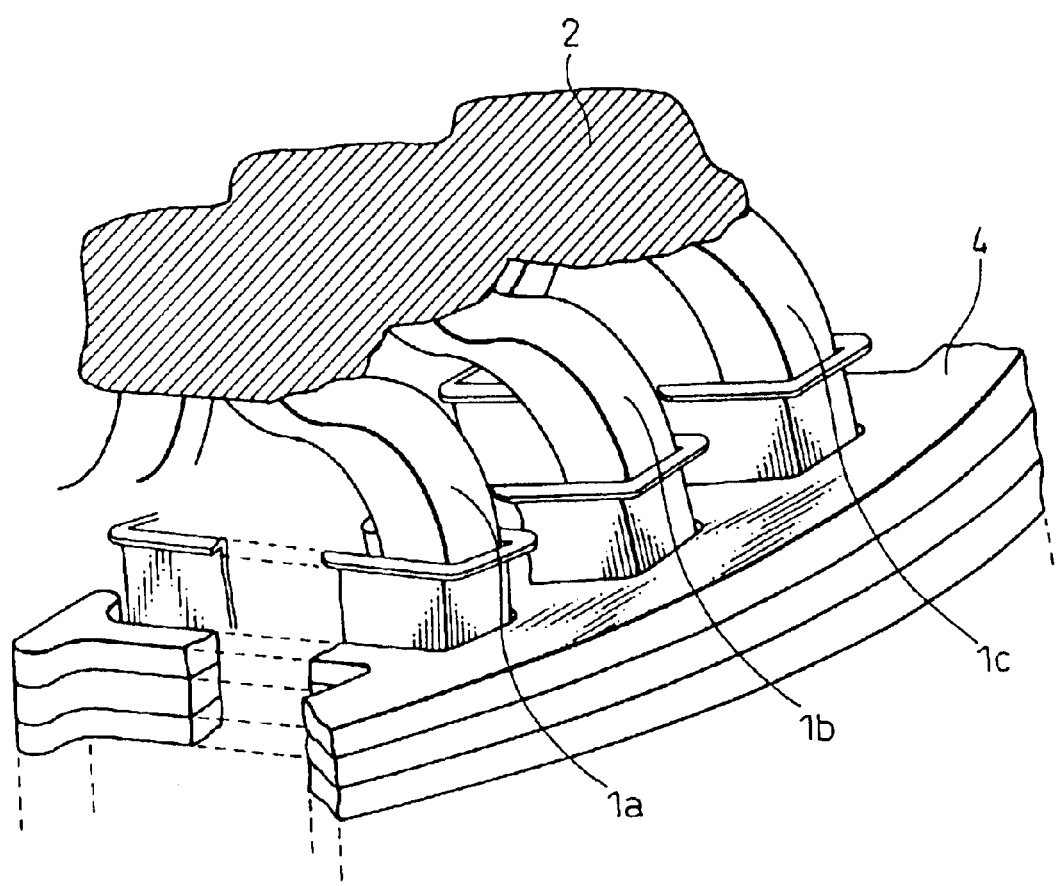
FIG. 4 is a view illustrating an embodiment in which the coil end portions of the stator are secured and insulated with a powdery epoxy resin.

FIG. 4 illustrates an embodiment of the present invention in which the coil end portions 1a, 1b, 1c of the stator same as that of FIG. 3 are secured and insulated with a powdery epoxy resin. Being secured and insulated with the powdery epoxy resin, the coil ends are firmly secured to each other and do not come in contact with each other to cause defective insulation even when a shock is given thereto. Concretely speaking, the powdery epoxy resin that is used is a blend of "Powdery Epoxy Resin F6975" (bisphenol-type epoxy manufactured by Somarl Co., fused silica and an acid anhydride). The coil ends of the stator are pre-heated at 190° C. for 40 minutes, immersed in a vessel containing the powdery epoxy resin such that the coil ends of the stator are coated with the powdery epoxy resin which is, then, cured by being heated at 190° C. for 20 minutes.

The stator of FIG. 4 was mounted on the electric motor for sealed compressors of FIG. 1 and was really operated by using the fluorinated hydrocarbon such as 1,1,1,2-tetrafluoroethane (HFC134a) as a coolant and by using polyalkylene glycol oil, polyol ester oil or polyvinyl ether oil as the refrigerator oil. No deterioration of the insulating material was recognized.

The present invention provides a curable insulating material which remains chemically stable exhibiting excellent insulating property for use in electric motors for sealed compressors that use, as a coolant, a fluorinated hydrocarbon such as 1,1,1,2-tetrafluoroethane (HFC134a) and further use, as a refrigerator oil, a polyalkylene glycol oil, a polyol ester oil or a polyvinyl ether oil. When insulated with this insulating material, a dielectric breakdown by shock can be prevented in the free conductor portions.

What is claimed is:

1. An electric motor for sealed compressors using a fluorinated hydrocarbon as a coolant, wherein a plurality of free conductors are insulated and secured relative to each other with an epoxy resin, wherein:

said epoxy resin is obtained by curing a powdery epoxy resin;

said electric motor for sealed compressors is provided with a stator core of a structure in which a coil wound on the stator core is constituted by a plurality of conductor segments, and ends (coil ends) of the conductor segments, which protrude beyond the core, are joined to each other to form the coil, and the plurality of coil ends are insulated from and secured to each other; and the coil ends are exposed to an atmosphere where the coolant flows;

the powdery epoxy resin comprises an epoxy resin, a solid filler, and an acid anhydride; and the solid filler is fused silica.

2. An electric motor for sealed compressors according to claim 1, wherein a 1,1,1,2-tetrafluoroethane is used as the coolant.

3. An electric motor for sealed compressors according to claim 1, wherein the motor for sealed compressors uses, as a refrigerator oil, a polyalkylene glycol oil, a polyol ester oil or a polyvinyl ether oil.

4. An electric motor for sealed compressors according to claim 1, wherein the stator core has a laminated core forming a plurality of slots extending through a laminated plate, a multi-phase stator winding includes the plurality of conductor segments which are held in the slots and are insulated from each other, wherein the conductor segments are arranged to extend toward an end surface side of the stator core outside the slots, and wherein the coil ends are formed by connection patterns that connect in series different layers in the slots, which are spaced apart to meet a pitch of magnetic poles of the rotor thereby to form a group of coil ends repeating chiefly the connection pattern on the end surface side of the stator core, the coil ends being spaced apart from each other and being insulated from and secured to each other with the powdery epoxy resin.

5. An electric motor for sealed compressors using a fluorinated hydrocarbon as a coolant, the electric motor comprising a stator core and a coil, wherein the coil is wound on the stator core, and the coil is formed by a plurality of conductor segments, and ends of the conductor segments, protrude beyond the stator core into an atmosphere where the coolant flows, and groups of the ends are electrically joined to each other at junctions, respectively, to form the coil, and the junctions are insulated from and secured to each other with the epoxy resin, such that the epoxy resin is exposed to the atmosphere where the coolant flows, wherein:

the epoxy resin comprises an epoxy resin, a solid filler, and an acid anhydride; and the solid filler is fused silica.

6. An electric motor for sealed compressors according to claim 5, wherein:

the stator core has a laminated core in which a plurality of slots are formed;

the conductor segments are held in the slots and form a multi-phase stator winding;

the conductor segments extend outside the slots toward an axial end of the stator core;

the junctions form a repeating connection pattern at the axial end of the stator core, wherein the junctions are spaced apart from each other, insulated from one another, and secured to each other with the epoxy resin.

7. An electric motor for sealed compressors according to claim 5, wherein a 1,1,1,2-tetrafluoroethane is used as the coolant.

8. An electric motor for sealed compressors according to claim 5, wherein the motor for sealed compressors uses, as a refrigerator oil, a polyalkylene glycol oil, a polyol ester oil or a polyvinyl ether oil.

9. An electric motor for sealed compressors according to claim 5, wherein the epoxy resin is a cured powdery epoxy resin.

* * * * *